Feb. 10, 1959 — K. E. HUMBERT, JR — 2,873,029
SCREW NECK TYPE FILTER

Filed March 29, 1955 — 2 Sheets-Sheet 1

INVENTOR
KINGSLEY E. HUMBERT, JR.

BY *Shoemaker & Mattare*

ATTORNEYS

Feb. 10, 1959 K. E. HUMBERT, JR 2,873,029
SCREW NECK TYPE FILTER
Filed March 29, 1955 2 Sheets-Sheet 2

INVENTOR
KINGSLEY E. HUMBERT, JR.

BY *Shoemaker & Mattare*

ATTORNEYS

United States Patent Office 2,873,029
Patented Feb. 10, 1959

2,873,029

SCREW NECK TYPE FILTER

Kingsley E. Humbert, Jr., Gastonia, N. C., assignor to Wix Corporation, Gastonia, N. C., a corporation of North Carolina Application March 29, 1955, Serial No. 497,606

15 Claims. (Cl. 210—440)

This invention relates to the class of filters and is directed particularly to filters of relatively small size designed for use upon internal combustion engines of passenger vehicles, busses, trucks and the like. Filters of the type to which the present invention relates, designed for use upon internal combustion engines, conventionally embody a fixed casing in which a removable filtering element is housed or a sealed casing in which the filter element is enclosed and which sealed type must be completely replaced when the element is no longer serviceable. In the first mentioned type, when the filter element becomes clogged and no longer functions satisfactorily, it must be removed from the casing for replacement by a clean element. This, of course, involves the handling of the dirty element with the attendant possibility of the person changing the element dirtying his clothing or of dripping oil over the engine or vehicle body.

In the second type of filter where the entire unit must be replaced when the filter element is no longer functioning, it is necessary to disconnect oil lines for making such replacement. This operation is not only time consuming but frequently develops difficulties where reconnection of the oil line couplings are involved.

An object of the present invention, in the light of the foregoing, is accordingly to provide a new and improved filter structure which is designed to be mounted in operative position by screw thread means forming a part of the filter element housing or shell and engaging a threaded fixed unit or bracket permanently mounted on a part of the engine structure whereby no longer serviceable filter elements may be replaced by new ones without having to handle oily or dirty parts or having to break and reconnect oil lines.

Another object of the invention is to provide in a manner as hereinafter set forth, a can type filter unit having a screw neck for mounting the same and wherein there is employed in the can or casing a pleated paper filter element of new design or form with novel means for maintaining the element in operative position within the casing or shell.

A further object of the invention is to provide, in a manner as hereinafter set forth, an annular pleated paper filter element which is designed in a novel manner for cooperation with an oil conducting tube forming a part of a bracket mounting on which the filter is secured, whereby the unclean oil is carried to one end of the interior of the can or shell and distributed over the adjacent end of the filter element to fill the can or shell around the filter element and return radially through the latter for redistribution in clean form in the engine oil circulating system.

A still further object of the invention is to provide in a manner as hereinafter set forth, a can type filter having a screw mounting means for attaching the same to or mounting it on a supporting bracket having an elongate dirty oil outlet tube, wherein an annular pleated paper filtering unit of new design is provided which is formed for the extension of the outlet tube axially therethrough when the can is screwed onto the mounting bracket, with means forming a seal around the tube inwardly of the outlet end thereof whereby to compel the oil to flow across an end of the element to the outer side thereof for return through the element in filtered clean condition.

The means whereby the foregoing and possibly other objects are attained will be best understood from a consideration of the following detailed description taken in connection with the accompanying drawings forming a part of the specification with the understanding that the invention is not confined to a strict conformity with the showing of the drawings but may be changed or modified within the scope of the appended claims.

Figure 1:
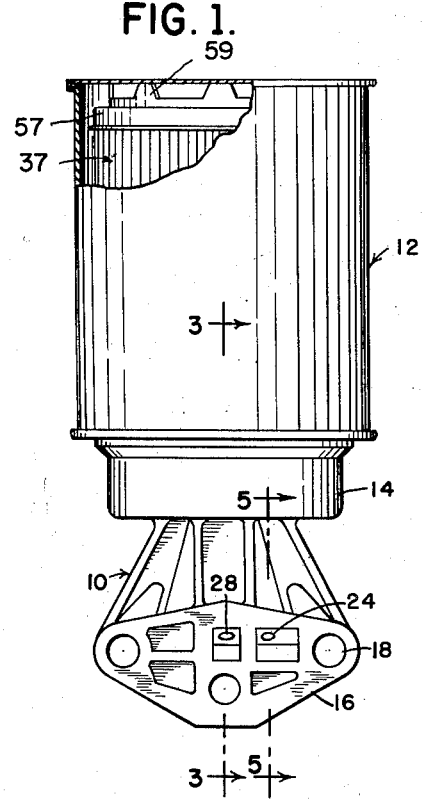
Fig. 1 is a view in elevation of a filter unit constructed in accordance with the present invention, the same being shown mounted on a supporting base and a portion of the unit being broken away.
Figure 2:
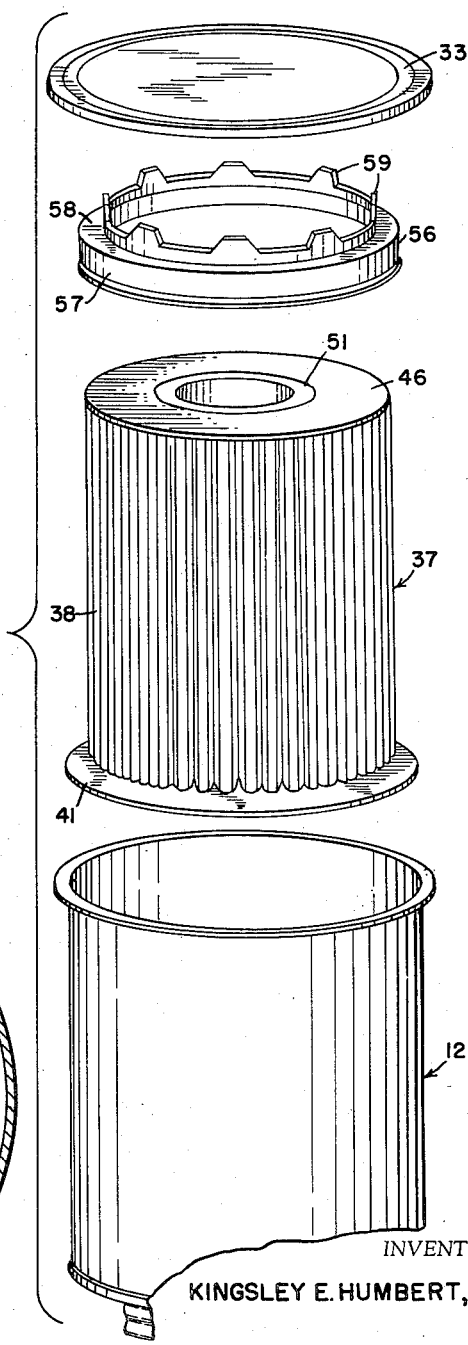
Fig. 2 is an exploded view of the filter unit.
Figure 4:
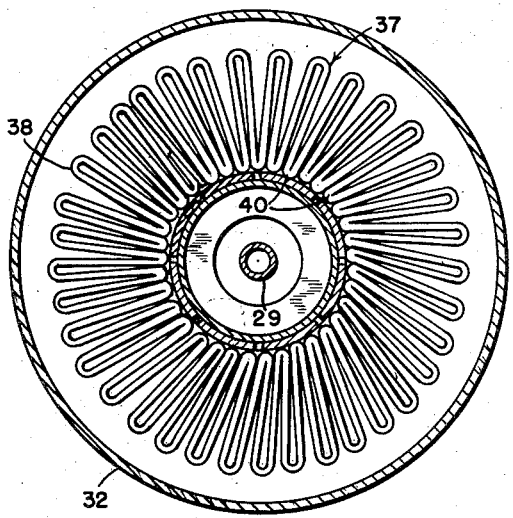
Fig. 4 is a transverse section taken on the line 4—4 of Fig. 3, looking in the direction of the arrows.
Figure 3:
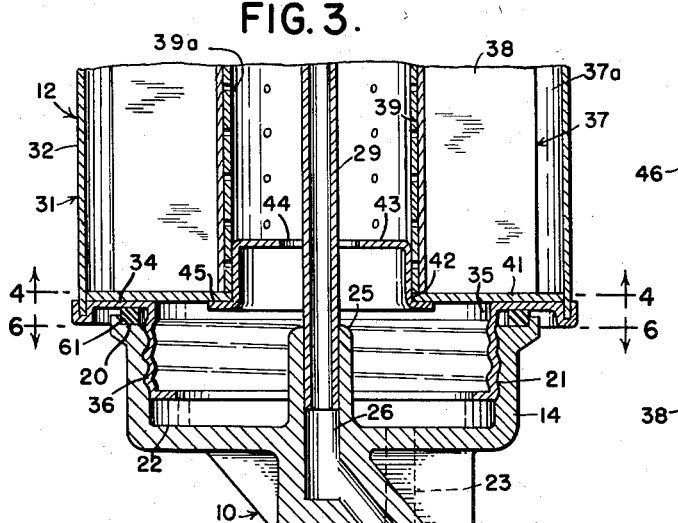
Fig. 3 is a partial section taken substantially on the line 3—3 of Fig. 1, and on an enlarged scale.

Referring now more particularly to the drawings, the numeral 10 generally designates a mounting bracket for a filter unit constructed in accordance with the present invention while the numeral 12 generally designates such unit.

The mounting bracket which is designed to be secured to the motor vehicle engine in the proper location for the connection therewith of oil lines by which the dirty oil is brought outwardly and cleaned or filtered oil is returned for re-use, comprises a circular cup-like body 14 having formed integral with the bottom wall thereof the mounting bracket or plate 16 which is provided with suitable bolt holes 18 for securing the bracket to the engine body. The body 14 has the top wall 20 thereof of substantial width and flat as shown and the inner face of the side wall is screw threaded as indicated at 21 for the purpose hereinafter set forth.

The interior of the body 14 provides a sump 22 into which filtered oil is discharged from the filter unit 12 for return to the engine oil lines or oil gallery, not shown, by way of the return flow passage 23 and port 24, the port opening through the face of the mounting plate 16.

In the center of the sump 22, there is provided the upstanding nipple 25 having the passage 26 therethrough which communicates with the laterally directed passage or bore 27 formed through the lower part of the bracket structure and directed toward the plate 16 through the mounting face of which it opens by way of port 28. This port receives the dirty oil from the engine for introduction into the filter unit by way of the tube 29, the lower end of which is secured in the upper end of the nipple passage 26 while the upper end of the tube has suitable outlet openings 30.

The filter unit 29 comprises a can or shell 31 which embodies the circular wall 32, the top end wall or head 33 and the bottom wall 34. This bottom wall has formed therethrough the relatively large opening 35 which is encircled or defined by the integral axially directed and threaded neck 36 which is adapted to be threaded into the open top of the body 14 in engagement with the screw threads 21 thereof.

Disposed within the housing or shell is a filter element which is generally designated 37. This element comprises the elongate annular pleated paper filter body 38 which is of an overall diameter less than the inside diameter of the housing and has a central passage 39 therethrough. The flutes of the pleated body are directed radially as shown, the inner fold edges 40 defining the tubular form of the passage 39.

The filter body or element 38 has extending through the central passage 39 thereof a tubular bracing or reinforcement unit here shown as being in the form of a foraminous tube 39a. This tube functions to support the filter paper against the oil pressure to prevent collapse of the filter. While a perforated or foraminous tube has been illustrated, it is to be understood that any other type of bracing means may be employed such as a spiral wire or coil or the like.

The bottom ends of the flutes of the filter are secured by suitable cement or adhesive to a face of a flat disc 41 which is of greater diameter than the fluted paper body 38 and is of approximately the same diameter as the interior of the can or housing. This disc forms a bottom wall or gasket for the paper body and it has a central opening 42 which is of the same diameter as the tube 39a and fitted in this opening is an inverted metal thimble 43 which has a central opening 44 therethrough. Any suitable means may be provided for securing this thimble in position but it is preferred that it be forced into the tube 39a and secured by suitable cement and the thimble is also provided with an encircling flange 45 which bears against the outer face of the disc 41 as illustrated.

Figure 7:
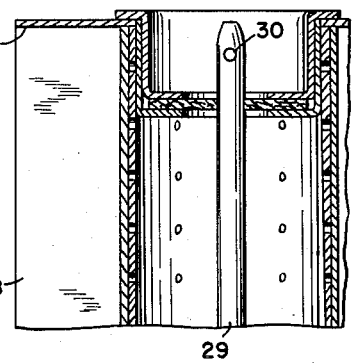
Fig. 7 is a sectional detail through the upper end portion of the filter element per se and illustrating the oil supply tube therein.
Figure 5:
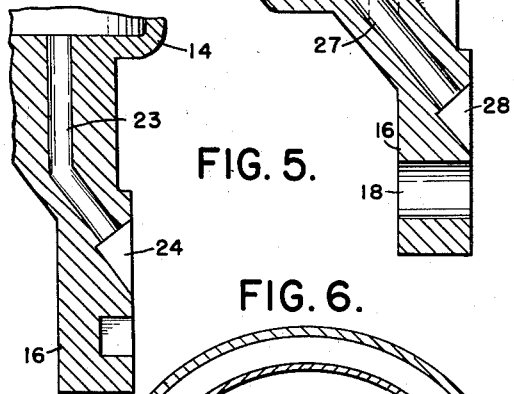
Fig. 5 is a detail section taken substantially on the line 5—5 of Fig. 1.
Figure 8:
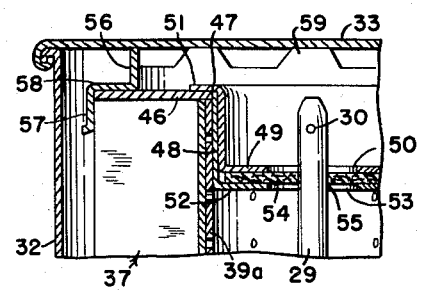
Fig. 8 is a partial section taken through the upper end of the filter unit showing the spacer between the shell and the filter element.
Figure 6:
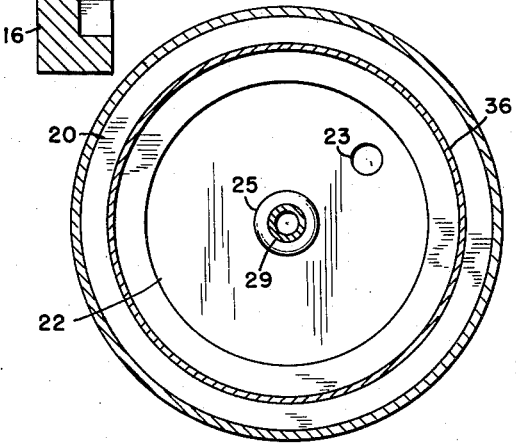
Fig. 6 is a horizontal section taken substantially on the line 6—6 of Fig. 3.

The top end of the paper body has cemented thereto the head disc 46. The diameter of this disc is approximately the same as the outside diameter of the body 38 as shown in Figs. 1, 7 and 8. This disc, like the disc 41, has the opposing ends of the flutes or pleats of the paper body cemented thereto by any suitable adhesive which is immune to solvent action of oil or other liquid which may be passing through the filter.

The head disc 46 is also provided with a central opening 47 and this opening is of the same diameter as the tube 39a and has fitted therein a head thimble 48 which consists of an outer part 49 having a central opening 50 therethrough and an encircling flange 51 which rests upon the top of the disc 46 and an inner part 52 into which the outer part telescopes and which has a central opening 53 corresponding with the opening 50. Secured between the thimble parts 49 and 52 is a gasket disc 54 having a central opening 55 which is concentric with the openings 50 and 53. The opening 55 of this gasket disc is approximately equal in diameter to the diameter of the tube 29 which is designed to pass therethrough as illustrated so that a tight fluid connection is established with the tube.

The overall height of the filter element 37 is less than the interior length of the shell in which the element is enclosed and when the element is placed in the shell, the bottom disc 41 rests upon the wall 34 and forms a fluid tight engagement therewith, the periphery of the disc 41 being tight against the inner surface of the wall 32. This prevents oil from passing from the space 37a around the disc 41 into the sump 22.

As stated, the overall length of the element 37 is less than the interior length of the housing and accordingly, when the element is in position, there will be a space between the top of the element or the head disc 46 and the top wall or end wall 33 of the housing. This space is provided for the flow of oil from the upper end of the tube 29, through the opening or openings 30, across the disc 46 and into the space 37a surrounding the filter element.

As illustrated, the overall length of the tube 29 is such that when the filter structure is mounted on the mounting bracket 10 and the threaded neck 36 is secured to the bracket, the upper end of the tube will project through the opening 55 of the gasket 54 into the nipple 48.

In order to maintain the element 37 in position, a spacing ring or collar 56 is provided which has a flange portion 57 which surrounds the top end of the element and an inwardly extending wall portion 58 which rests upon the head disc 46, and projecting upwardly from the wall 58 are spaced upstanding or axially directed ears 59 which contact the inner side of the wall 33. From this it will be seen that when the element is placed in position in the can housing and the spacing collar 56 is located upon the upper end, the placing of the can end wall 33 in position and the securing the same with the side wall 32 will impose some pressure against the adjacent end of the filter element and thus hold its firmly in position upon the bottom wall 34.

Figure 9:
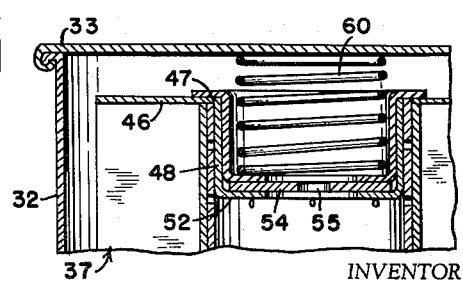
Fig. 9 is a sectional detail corresponding to Fig. 8 but showing another type of spacing means between the can or shell and the filter element.

As an alternative means for holding the filter element in position in the can, use may be made of a coil spring 60 as illustrated in Fig. 9, one end of which would be seated in the outer part 49 of the thimble 48 while the opposite end has the wall 33 of the can bearing thereagainst.

It will be seen from the foregoing that the filter element is readily attached to the mounting bracket 10 by means of the threaded neck 36 and in being so mounted the oil outlet tube 29 will extend through the opening 44 at the bottom end of the element and project through the gasket opening at the top end in the manner stated.

In order to insure a leak-proof connection, use may be made of an annular gasket 61 encircling the threaded neck 36 and compressed against the top surface 20 of the side of the bracket body 14 as shown.

When the filter is mounted as stated, the dirty oil from the engine oil system will be discharged through the top end of the tube 29 and will flow outwardly into the encircling space 37a to pass radially inwardly through the fluted filter 37 to the central tube passage 39a thereof. From this central passage, it flows back through the opening 34 into the sump 22 to return to the engine by way of the passage 23.

I claim:

1. A filter for attachment to a mounting support of the character described, comprising a can shell having a closed end wall and an opposite end wall provided with an opening, a threaded neck carried by said opposite wall and encircling the opening, an annular pleated filter element of substantial length in the casing having an axial passage therethrough and resting at one end upon said opposite end wall, said element being spaced from the encircling can shell wall, a gasket secured within and across the end of the axial passage adjacent to said closed end wall and having a central opening of materially smaller diameter than the passage, the opposite end of the passage providing an outlet for filtered liquid of larger diameter than said central opening, and means interposed between said closed end wall and the adjacent end of the filter element for holding the filter element in position on said opposite end wall.

2. A filter for attachment to a mounting support having an open cup body forming an oil sump having an outlet and an oil inlet tube rising from said sump and having an outlet opening in its free end, said filter comprising a can shell having a side wall, a closed outer end wall and an inner end wall, the inner end wall having an opening and a neck encircling the opening and extending axially of the shell for extension into the sump, means for securing the neck in the sump in fluid tight connection with the body, an elongate annular fluted filter element in the shell of an outside diameter less than the inside diameter of the shell providing a circular oil space around the element, said element having an axial flow passage therethrough and resting at one end upon and in fluid tight engagement with the inner end wall of the can shell, the element being of less length than the shell providing an end oil space leading to the circular space, the flow passage at said one end opening into the sump, the said oil inlet tube being of a length to extend to the end of the axial flow passage remote from the sump, a gasket partitioning said flow passage at the other end and having an opening formed to have the said free end of the tube extend therethrough in fluid tight engagement with the edge thereof for discharge of oil into said end space, and a single means secured between the shell outer end wall and the adjacent end of the filter element for securing the latter against movement.

3. A filter comprising a casing having a side wall, a closed end wall and an end wall having an opening, a mounting neck carried by the second mentioned end wall in encircling relation with said opening, an elongate longitudinally pleated annular filter element in the casing having an axial passage therethrough and having an outside diameter and an overall length respectively less than the inside diameter and length of the casing, means closing the ends of the flutes formed by said pleats, said element resting in fluid tight engagement at one end upon said second mentioned wall and said axial passage opening into said neck, a gasket partitioning the axial passage at the end remote from the neck and having a restricted center opening, and a single means between and in engagement with both the first mentioned closed end of the casing and the adjacent end of the filter element and holding the said one end of the element upon the second mentioned wall.

4. The invention according to claim 3, with an apertured thimble secured in the gasket end of the axial passage and supporting said gasket in the passage.

5. The invention according to claim 3, with a thimble member inserted in the end of the axial passage adjacent to said neck and having an opening for the flow of liquid therethrough.

6. The invention according to claim 3, with an apertured thimble secured in the gasket end of the axial passage and supporting said gasket in the passage and an apertured thimble secured in the axial passage adjacent to said neck.

7. The invention according to claim 3, wherein the last stated means comprises a circular row of members extending longitudinally of the element.

8. The invention according to claim 3, wherein the last stated means comprises a collar mounted upon the end of the filter element and a plurality of spaced members carried by the collar and extending toward the said closed end of the casing.

9. The invention according to claim 3, wherein said last means comprises a coil spring.

10. A filter comprising a casing having a side wall, a closed end wall and an end wall having an opening, a mounting neck carried by the second mentioned end wall in encircling relation with said opening, an elongate longitudinally pleated annular filter element in the casing having an axial passage therethrough and having an outside diameter and an overall length respectively less than the inside diameter and length of the casing, a disc secured to the ends of the pleats of the filter element adjacent to said neck and closing the ends of the adjacent flutes formed by the pleats, the disc being of a diameter approximating the inside diameter of the casing and having fluid tight engagement upon the adjacent end wall, the disc having a central opening communicating with the axial passage, a second disc closing the other ends of said flutes and having a diameter less than that of the first disc and approximately the same as the outside diameter of the filter element and the second disc having a center opening communicating with the axial passage, a gasket partitioning the end of the axial passage remote from the neck and having a restricted center opening, and means between the first mentioned closed end of the casing and the adjacent end of the filter element and holding the said one end of the element upon the second mentioned wall.

11. A filter element comprising an elongate longitudinally pleated annular body of filter material having an axial passage therethrough and an opening at each end, a first disc secured to the ends of the pleats at one end of the body and concentric with the body and closing the ends of the adjacent flutes formed by the pleats, the disc being of a diameter materially greater than the outside diameter of the annular body, the disc having a central opening communicating with the axial passage of the body, a second disc secured to and concentric with the other end of the body and closing the ends of the adjacent flutes formed by the pleats, the second disc having a diameter less than that of the first disc and approximately the same as the overall diameter of the annular body, and a gasket partitioning the opening at the end of the axial passage at that end of the body to which the second disc is secured, the gasket having a restricted opening concentric with the said axial passage and of materially smaller diameter than the opening at the other end of the axial passage.

12. A filter element according to claim 11, with a thimble in the form of a cup having a bottom and extending through the opening of the second disc into the adjacent open end of the axial passage and having an encircling outer end flange overlying and engaging the outer surface of and terminating short of the periphery of the second disc, the thimble having a central opening in the bottom and said thimble having the gasket secured to the bottom thereof and concentric with the opening therein.

13. A filter element according to claim 11, with a thimble in the form of a cup having a bottom and extending through the opening of the first disc into the adjacent open end of the axial passage and further having an encircling outer end flange overlying and engaging the outer surface of and terminating short of the periphery of the first disc, the thimble having an opening in the central part of the bottom thereof which opening is of a larger diameter than the gasket opening.

14. A filter element according to claim 11, with a perforated tube extending through the axial passage and engaged by the pleats of and reinforcing the annular body, a thimble in the form of a cup having a bottom and extending through the opening in the second disc into the adjacent open end of the axial passage and into the adjacent end of the perforated tube, the thimble further including an outer end encircling flange overlying and secured against the outer surface of the second disc and terminating short of the periphery of the second disc, said thimble having a central opening in the bottom thereof and having said gasket secured to the thimble bottom with the opening of the gasket and the opening of the thimble bottom concentric, a second thimble in the form of a cup having a bottom and extending through the opening of the first disc into the adjacent open end of the axial passage into and secured in the adjacent end of the perforated tube, the last named thimble further having an outer end encircling flange overlying and secured to the outer surface of the first disc and terminating short of the periphery of the first disc, and said last named thimble having an opening through the center of the bottom thereof which is of materially larger diameter than the opening of the gasket.

15. The invention according to claim 14, wherein the first named thimble comprises an inner part and an outer part having the inner part telescoped thereinto and the bottom consisting of spaced portions of the two parts between which portions the said gasket is secured and the said flange of the first named thimble forming an extension of one of said parts.

References Cited in the file of this patent

UNITED STATES PATENTS

| | | |
|---|---|---|
| 2,203,668 | Burckhalter | June 11, 1940 |
| 2,464,870 | Kamrath | Mar. 22, 1949 |
| 2,533,266 | Kovacs et al. | Dec. 12, 1950 |
| 2,627,350 | Wicks | Feb. 3, 1953 |
| 2,739,916 | Parker | Mar. 27, 1956 |